Inventors:
Hans Schlemm
Peter Mertens
By: Spencer & Kaye
Attorneys

Dec. 22, 1970  H. SCHLEMM ET AL  3,550,071
TRANSDUCER SYSTEM

Filed May 9, 1969  2 Sheets-Sheet 2

Inventors:
Hans Schlemm
Peter Mertens
By: Spencer & Kaye
Attorneys

United States Patent Office 3,550,071
Patented Dec. 22, 1970

3,550,071
TRANSDUCER SYSTEM
Hans Schlemm and Peter Mertens, Bremen, Germany, assignors to Fried, Krupp Gesellschaft mit beschrankter Haftung, Essen, Germany
Filed May 9, 1969, Ser. No. 823,417
Claims priority, application Germany, May 10, 1968, 1,762,258
Int. Cl. H04r 23/00
U.S. Cl. 340—8
5 Claims

ABSTRACT OF THE DISCLOSURE

An electroacoustical transducer system for transmitting or receiving acoustical energy in which the transducer element is resiliently supported on a rigid mounting member with its sensitive axis aligned in a particular direction with respect thereto. The transducer element, having a mass M and a resilience F along its sensitive axis, is mounted along its sensitive axis between elastic members having resiliences $F_1$ and $F_2$; and in which elements having masses $M_1$ and $M_2$ forming part of the transducer assembly may be interposed between the ends of the transducer element and the elastic elements. The rigid mounting member may be rigidly affixed to a support susceptible to maximum sound-induced vibrations in a particular direction with the transducer sensitive axis aligned in such direction. If the condition $$F_1\left(M_1+\frac{M}{2}\right)=F_2\left(M_2+\frac{M}{2}\right)$$

is satisfied, interaction between acoustic signal-related dimensional changes of the transducer element along its sensitive axis and vibration of the support is obviated. For the special case where no end masses $M_1$ and $M_2$ are used, the necessary and sufficient conditions for decoupling exist where $F_1$ equals $F_2$.

BACKGROUND OF THE INVENTION

Acoutical transducer systems in which a transducer element is adapted to receive or transmit acoustical energy in a sonic field such as air or water are required to be mounted on some requisite support which may display sound-induced vibration which, if transmitted to the transducer element, will give rise to spurious signals. Moreover, the sensitive axis of the transducer and the direction in which maximum amplitude vibration of the support may occur may coincide. For these reasons, it is often essential to mount the transducer element to its mounting member by means of an elastic bearing to provide a degree of sound insulation between the transducer element and the support to which the mounting member is fixed. Such systems have provided, in the prior art, only partial sound insulation as aforesaid and more extensive damping often is employed in the form of an additional elastic member serving to connect the mounting member for the transducer element to the support. In order to achieve sound insulation extending into the low-frequency range, this additional elastic member must be of very low resilience. As a consequence, it is not only difficult to establish and maintain proper orientation of an array of so-mounted transducers, but each will exhibit resonance at some low frequency which, in response to vibration at such resonant frequency transmitted through the support, will give rise to spurious signals of large amplitude.

SUMMARY OF THE INVENTION

The present invention is directed to an electroacoustical transducer system which in its totality comprises a support, a mounting member, a transducer and elastic means resiliently connecting the transducer to the mounting member. The mounting member is rigid and is fixed rigidly to the support with the sensitive axis of the transducer aligned in the direction in which the support is most susceptible to vibrations due to sound energy transmitted through it. The elastic supporting means for the transducer comprises a pair of elastic members each having its modulus of elasticity and dimensional characteristics so chosen as to display respective resiliences $F_1$ and $F_2$ and which support the transducer element between them along the direction of its sensitive axis. Elements of respective masses $M_1$ and $M_2$ may be interposed between the opposite ends of the transducer element and the elastic members. Under such conditions, if the following equation is satisfied, interaction between vibration of the support and dimensional changes of the transducer element along its sensitive axis will be eliminated;

$$F_1\left(M_1+\frac{M}{2}\right)=F_2\left(M_2+\frac{M}{2}\right)$$

It is also possible to mount the transducer element on a rigid mounting member therefor, which mounting member is symmetrically constructed between radial shoulder portions thereof, and with elastic bearings being interposed between such shoulder portions and the opposite ends of a cylindrical transducer element, in which case the necessary and sufficient condition wherein the resiliences of the two elastic members are equal will produce the aforesaid decoupling between sound propagated through the solid support and dimensional changes of the transducer element along its sensitive axis.

DESCRIPTION OF THE PREFERRED EMBODIMENTS

Figure 1:
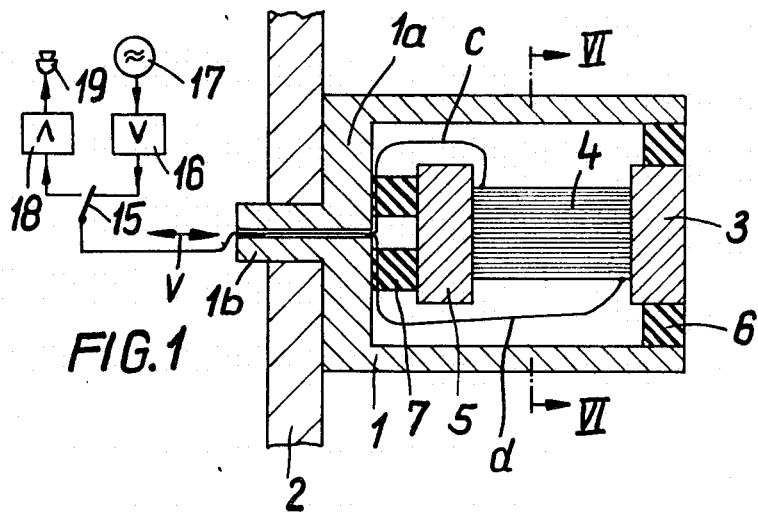
FIG. 1 is a longitudinal section taken through a transducer assembly according to the present invention.

The system as shown in FIG. 1 embodies a mounting member 1 for the transducer element 4, the mounting member being of generally cylindrical form having a base portion 1a provided with means 1b by which the mounting member 1 is rigidly affixed to a support member 2. It will be appreciated that transducer systems according to the present invention may be adapted either for transmitting or receiving acoustical energy in a sonic field such as air or water and, for this purpose, as is shown in FIG. 1, a switch 15 is employed to connect the system either to the amplifier 16 or the amplifier 18 which are respectively connected to the signal generator 17 and the headset 19. It will also be understood, according to well-known principles, that the transducer element 4 is sensitive to dimensional changes along a particular axis, the conductors $c$ and $d$ being connnected to the transducer element 4 at spaced stations along this axis substantially as is shown. Upon reception of acoustical energy, the transducer element 4 will generate a signal across the conductors $c$ and $d$ whereas a signal applied by the generator 17 and corresponding amplifier 16 across the conductors c and d will create dimensional changes along the sensitive axis of the transducer 4.

In the embodiment of the invention shown in FIG. 1, the open end of the mounting member 1 is closed by the transmit-receive button 3 and the surrounding elastic member 6 which serves to resiliently mount the member 3 upon the rigid mounting member 1. The button 3 engages one end of the transducer element 4 and the opposite end of the transducer element 4 is contacted by the button 5 which, as shown, is interposed between the corresponding end of the transducer element 4 and the elastic bearing element 7. Each of the elastic members 6 and 7 is chosen as to modulus of elasticity and dimensional characteristics so as to display respective resiliences $F_1$ and $F_2$. The transducer element 4 has a resilience F along its sensitive axis and has an inherent mass M whereas the respective buttons 3 and 5 possess inherent masses $M_1$ and $M_2$. It will be noted further that the sensitive axis of the transducer element 4 is aligned in the direction in which the support 2 is most susceptible to vibration, such direction being indicated by the double-headed arrow V in FIG. 1.

Figure 2:
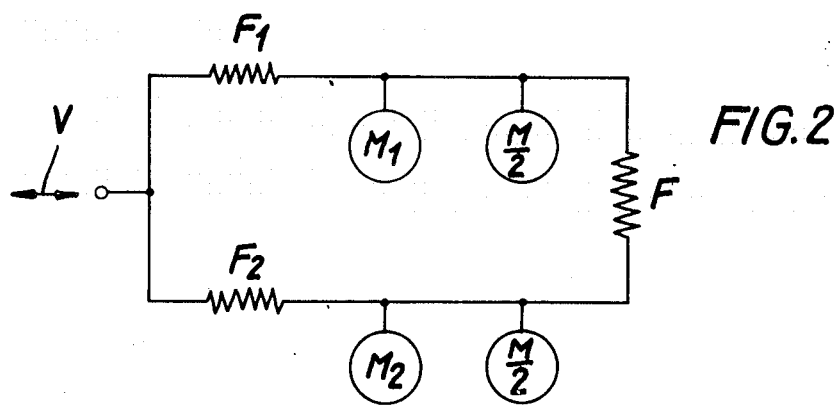
FIG. 2 is a mechanical circuit diagram of the system according to FIG. 1.
Figure 3:
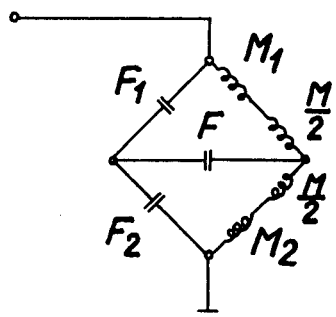
FIG. 3 is an electrical circuit diagram equivalent to that of FIG. 2.

The mechanical circuit diagram of the system as shown in FIG. 1 is illustrated in FIG. 2 and the equivalent electrical circuit diagram is illustrated in FIG. 3. From a study of these two figures, it will be apparent that no voltage or current will be impressed across the equivalent resilience F of the transducer element in FIG. 3 if the following condition is met:

$$F_1\left(M_1+\frac{M}{2}\right)=F_2\left(M_2+\frac{M}{2}\right)$$

With the above condition prevailing, decoupling is effected as between vibrations of the support 2 and dimensional changes along the sensitive axis of the transducer element 4 so that when transmitting, the transducer element 4 will not transmit vibration to the support 2 and, during reception, vibrations induced in the support 2 by the transmission of sonic energy therethrough will not be transmitted to the transducer element 4.

To the extent that the resiliences $F_1$ and $F_2$ remain linear with frequency, the system as above described is frequency-independent and the transducer element will remain insensitive to sounds transmitted through the support 2 for a desired frequency range with the additional benefit that the transducer mounting member is rigidly affixed and oriened with respect to the support structure and does not require an additional or intermediate elastic member for decoupling purposes.

Figure 6:
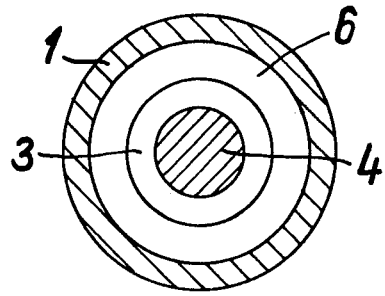
FIG. 6 is a transverse section taken along the plane of section line VI—VI of FIG. 1.

The elastic members 6 and 7 may be most conveniently formed of annular configuration, the buttons 3 and 5 being of circular plan view and the transducer element 4 being of circular cross section, as shown more clearly in FIG. 6.

Figure 4:
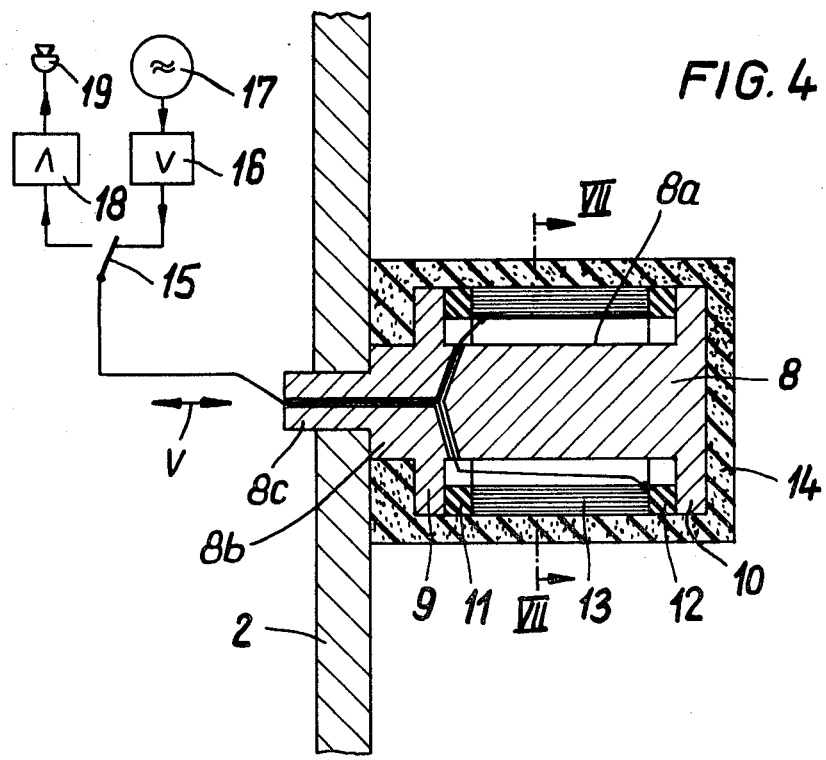
FIG. 4 is a longitudinal section taken through a modified form of the invention.
Figure 5:
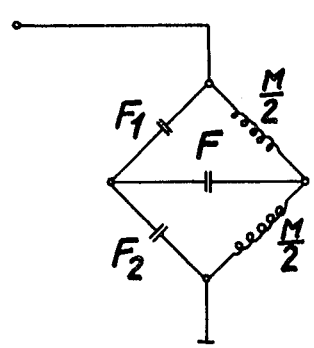
FIG. 5 is the electrical equivalent circuit diagram according to FIG. 4.
Figure 7:
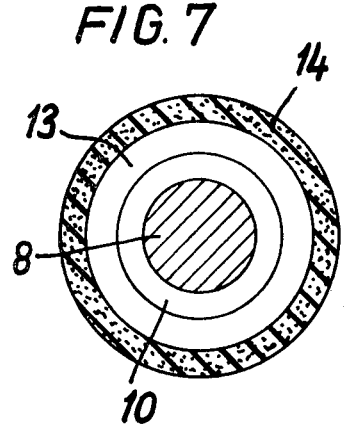
FIG. 7 is a transverse section taken along the plane of section line VII—VII of FIG. 4.

In the modified form of the invention shown in FIG. 4, the transducer element 13 is of cylindrical configuration having the sensitive axis aligned with the direction V in which the support 2 is most susceptible to displacement due to transmission of sound therethrough and in this form of the invention the mounting member 8 for the transducer element 13 includes a spool portion 8a and spaced radial shoulder portions 9 and 10. Additionally, the mounting member 8 includes a base portion 8b and means 8c by which it is rigidly affixed to the support member 2. Annular elastic members 11 and 12 are interposed between the opposite ends of the cylindrical transducer element 13 and the corresponding radial shoulders 9 and 10 and, as shown, the entire assemblage may be encapsulated in a layer 14 of synthetic resinous material in order to protect the assembly from environmental influences. The mechanical properties of the layer 14 are chosen neglectible compared to those of the other parts of the assembly in order not to affect the acoustic performance of the assembly. In this form of the invention, provided that the mounting member 8 is symmetrical inclusive of the shoulder portions 9 and 10 and the intervening spool portion 8a about a transverse plane centrally located with respect to the spool portion, and if the resiliences of the annular elastic members 11 and 12 are identical, the decoupling effect mentioned above in connection with FIG. 1 will prevail. The form shown in FIG. 4 may be considered a special case of the general condition specified above in conjunction with FIG. 1 wherein $M_1=M_2=0$ so that the necessary and sufficient condition is established when $F_1=F_2$.

It will be understood that the above description of the present invention is susceptible to various modifications, changes and adaptations.

What is claimed is:

1. An electroacoustical transducer assembly comprising, in combination:
   a mounting member adapted to be mounted upon a support which may impart vibration thereto;
   an electroacoustical transducer element exhibiting an inherent resilience F and having an inherent mass M;
   a pair of end members at the opposite ends of said transducer element and having respective inherent masses $M_1$ and $M_2$; and
   spring members interposed between said end members and said mounting member, said spring members having inherent resiliences $F_1$ and $F_2$,
   the characteristics $M_1$, $M_2$, $F_1$, $F_2$ and M being related as follows:

$$F_1\left(M_1+\frac{M}{2}\right)=F_2\left(M_2+\frac{M}{2}\right)$$

2. An electroacoustical transducer assembly, comprising, in combination:
   a mounting member adapted to be mounted on a support which may impart vibration thereto;
   an electroacoustical transducer element; and
   a pair of spring elements interposed between the opposite ends of said transducer element and said mounting member and having respective resiliences $F_1$ and $F_2$ which are equal.

3. In an electroacoustical transducer system, the combination which comprises:
   a support for holding an electroacoustical transducer in particularized orientation with respect thereto and which support is susceptible to sound-induced vibration;
   a mounting member rigid with said support so as to orient the mounting member with respect thereto and whereby the mounting member may vibrate therewith back and forth along a given path;
   an electroacoustical transducer adapter for signal-related dimensional changes along said given path;
   resilient means spaced apart along said path connecting said transducer to said mounting member for obviating interaction between dimensional changes of said transducer and vibration of said support; and
   a pair of elements having respective masses $M_1$ and $M_2$, where $M_1=M_2$, disposed at the opposite ends of said transducer, said resilient means comprising a pair of members having resiliences $F_1$ and $F_2$, where $F_1=F_2$, and interposed between said elements and said mounting member, said transducer having a mass M and a resilience F along said path, in which the characteristics $M_1$, $M_2$, $F_1$, $F_2$ and M are related as follows:

$$F_1\left(M_1+\frac{M}{2}\right)=F_2\left(M_2+\frac{M}{2}\right)$$

4. In an electroacoustical transducer system, the combination which comprises:
   a support for holding an electroacoustical transducer in particularized orientation with respect thereto and which support is susceptible to sound-induced vibration;

a mounting member rigid with said support so as to orient the mounting member with respect thereto and whereby the mounting member may vibrate therewith back and forth along a given path;

an electroacoustical transducer adapted for signal-related dimensional changes along said given path; and resilient means spaced apart along said path connecting said transducer to said mounting member for obviating interaction between dimensional changes of said transducer and vibration of said support, said resilient means comprising a pair of members engaging opposite end portions of said transducer and having respective resiliences $F_1$ and $F_2$ in which $F_1 = F_2$.

5. An electroacoustical transducer assembly, comprising, in combination:

a mounting member adapted to be mounted on a support which may impart vibration thereto back and forth along a given path;

a transducer element adapted for signal-related dimensional changes along an axis thereof, said axis being aligned with said path, and said transducer element being rotationally symmetrical about said axis;

resilient means interposed between said transducer element and said mounting member at spaced points along said axis for obviating interaction between dimensional changes in said transducer element and vibration of said mounting member; and a pair of end masses at the opposite ends of said transducer element, said resilient means comprising a pair of annular members concentric with said axis and having respective resiliences $F_1$ and $F_2$ therealong, said end masses having respective masses $M_1$ and $M_2$ in which that end mass of mass $M_1$ is interposed between one end of said transducer element and that annular member having resilience $F_1$ while the other end mass is interposed between the other end of said transducer element and the other annular member, the transducer element having a mass $M$ and a resilience $F$ along its axis, in which:

$$F_1\left(M_1 + \frac{M}{2}\right) = F_2\left(M_2 + \frac{M}{2}\right)$$

References Cited

UNITED STATES PATENTS

| | | | |
|---|---|---|---|
| 2,947,888 | 8/1960 | Harris | 340—11X |
| 2,961,637 | 11/1960 | Camp | 340—10 |
| 3,199,071 | 8/1965 | Massa | 340—10 |

RICHARD A. FARLEY, Primary Examiner

B. L. RIBANDO, Assistant Examiner

U.S. Cl. X.R.

340—10, 11